United States Patent [19]

Fukuba et al.

[11] 4,270,347
[45] Jun. 2, 1981

[54] EXHAUST GAS PURIFICATION SYSTEM FOR AN INTERNAL COMBUSTION ENGINE

[75] Inventors: Akio Fukuba, Kariya; Michio Morishita; Kenji Tanaka, both of Toyota; Toshinobu Nishi, Nagoya; Hideaki Ouchi, Oobu, all of Japan

[73] Assignees: Nippondenso Co., Ltd., Kariya; Toyota Jidosha Kogyo Kabushiki Kaisha, Toyota, both of Japan

[21] Appl. No.: 60,631

[22] Filed: Jul. 23, 1979

[30] Foreign Application Priority Data

Jul. 21, 1978 [JP] Japan .......................... 53-100875[U]

[51] Int. Cl.³ ............................................... F01N 3/10
[52] U.S. Cl. ......................................... 60/276; 60/290
[58] Field of Search .................................. 60/276, 290

[56] References Cited

U.S. PATENT DOCUMENTS

| | | | |
|---|---|---|---|
| 3,906,723 | 9/1975 | Matumoto | 60/290 |
| 4,175,386 | 11/1979 | Katahira | 60/290 |
| 4,189,915 | 2/1980 | Miura | 60/290 |
| 4,192,141 | 3/1980 | Nonoyama | 60/290 |
| 4,199,939 | 4/1980 | Hattori | 60/290 |

FOREIGN PATENT DOCUMENTS 52-46576 11/1977 Japan .......................................... 60/290

*Primary Examiner*—Douglas Hart
*Attorney, Agent, or Firm*—Cushman, Darby & Cushman

[57] ABSTRACT

An engine exhaust gas purification system has a secondary air system for supplying secondary air into the engine exhaust system. The secondary air system has an air metering valve and a switching valve. The air metering valve is operative to meter the secondary air supply in accordance with signals emitted by an air-fuel ratio sensor disposed in the exhaust system to detect the oxygen content of engine exhaust gases. The switching valve is disposed in the secondary air supply line downstream of the air metering valve to interrupt the supply of the secondary air into the exhaust system during a high load engine operation for thereby preventing the exhaust system and, particularly, the catalyst device therein from being overheated. The force to close the switching valve is strong enough to keep the valve closed against the counter-flow of engine exhaust gases from engine exhaust system back into the secondary air system.

9 Claims, 2 Drawing Figures

EXHAUST GAS PURIFICATION SYSTEM FOR AN INTERNAL COMBUSTION ENGINE

BACKGROUND OF THE INVENTION

1. Field of the Invention

The present invention relates to a system for purifying exhaust gases from an internal combustion engine and, more particularly, to an engine exhaust gas purification system of the type in which an air-fuel ratio sensor is disposed in the exhaust system of the engine to detect the oxygen content of the engine exhaust gases and to emit an output signal on the basis of which the supply of a secondary air into the engine exhaust system is controlled to maintain a substantially constant air-fuel ratio in the exhaust system so that a three way catalyst is most effectively operative to facilitate removal of the harmful components of the engine exhaust gases.

2. Description of the Prior Art

In the engine exhaust gas purification system of the type specified above, the secondary air supply is controlled by a metering valve which is operative in response to signals from the air-fuel ratio sensor. The applicants, however, have found through researches that, in spite of the secondary air supply being controlled in the manner discussed, a problem of overheating takes place in the engine exhaust system in a high load engine operating condition. It has also been known that the exhaust gases flow back into the secondary air supply system due to a high exhaust gas pressure or back pressure produced in a high load engine operating condition.

The secondary air metering valve can be used to interrupt the supply of the secondary air into the engine exhaust system in a high load engine operating condition. In this case, however, the spring for the metering valve must provide a predetermined spring force which is so small as to assure a good response of the metering valve. Such a small spring force would, in some cases, be insufficient to enable the metering valve to surely block the secondary air supply passage against a counter-flow of the engine exhaust gases during a high load engine operation.

SUMMARY OF THE INVENTION

It is therefore a primary object of the present invention to provide an improved engine exhaust gas purification system including a secondary air supply system in which the supply of the secondary air is interrupted during a high load engine operation to prevent the engine exhaust system from being overheated.

It is another object of the present invention to provide an exhaust gas purification system of the type specified above and in which not only the overheating of the engine exhaust system but also the counter-flow of the exhaust gases back into the secondary air supply system are prevented.

The engine exhaust gas purification system provided by the present invention comprises a secondary air supply system for supplying a secondary air into the exhaust system of the engine, an air-fuel ratio sensor disposed in the engine exhaust system to detect the oxygen content of the engine exhaust gases and emit an electric output signal representative of the oxygen content of the exhaust gases thus detected, and a three-way catalyst means disposed in the exhaust system, said secondary air supply system including a secondary air supply line having a downstream end connected to said exhaust system, an air pump having an air discharge port connected to said secondary air supply line, an air metering valve means disposed in said secondary air supply line downstream of said air pump and operative to control the supply of the secondary air into the exhaust system in accordance with the outputs of the air-fuel ratio sensor, and a switching valve means disposed in said secondary air supply line downstream of said air metering valve means and operative to interrupt the supply of the secondary air into said exhaust system during a high load engine operation.

The above and other objects, features and advantages of the present invention will become more apparent from the following description with reference to the accompanying drawings.

DESCRIPTION OF A PREFERRED EMBODIMENT

Figure 1:
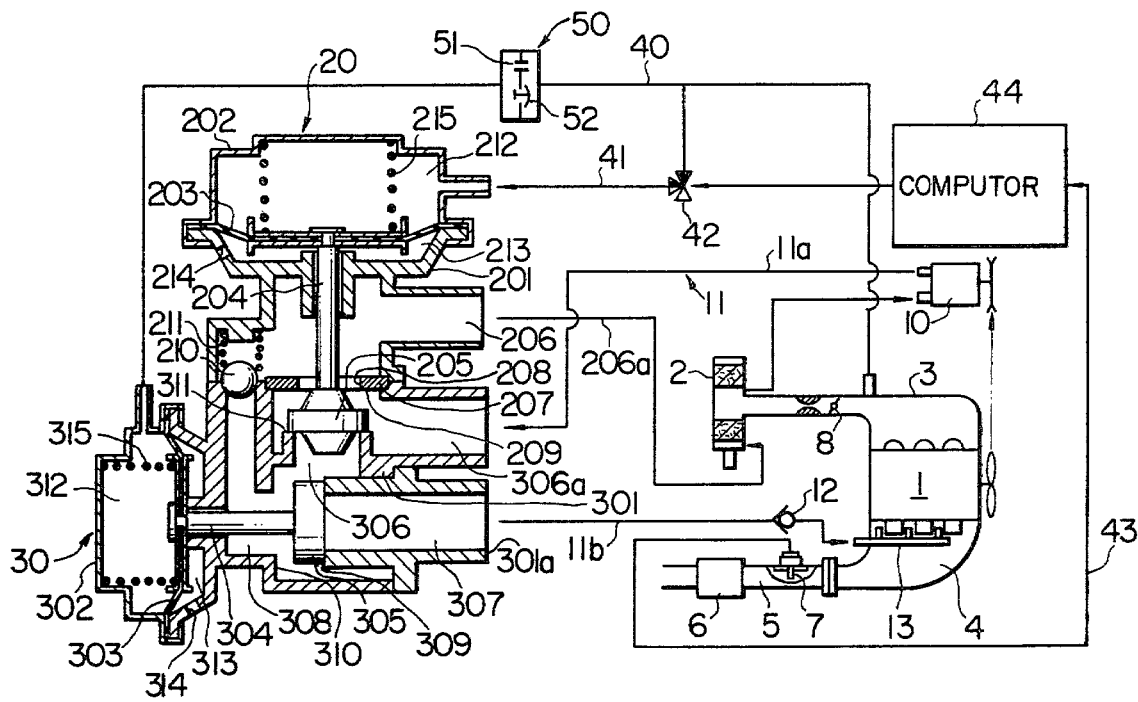
FIG. 1 is a partly sectional and partly diagrammatic illustration of an embodiment of an engine exhaust gas purification system according to the present invention.

Referring first to FIG. 1, an internal combustion engine 1 includes an air cleaner 2 and an intake manifold 3. Air sucked through the air cleaner 2 flows together with a fuel through the intake manifold 3 into the engine 1 to cause a combustion of the fuel therein. The combustion gases are exhausted from the engine 1 through an exhaust manifold 4 and an exhaust pipe 5 into the atmosphere. The exhaust pipe 5 is provided therein with a catalyst device 6 and an air-fuel ratio sensor 7 disposed just upstream of the catalyst device 6 to detect the oxygen content of the exhaust gases and emit an electric signal representative of the oxygen content of the exhaust gases thus detected. The catalyst device 6 contains a conventional three-way catalyst which is effective to simultaneously facilitate oxidation and reduction of some of the components of the engine exhaust gases. A throttle valve 8 is disposed in the intake system of the engine.

A secondary air supply system includes an air pump 10 to be driven by the engine 1. The air pump 10 has an air discharge port connected to a secondary air supply line 11 having a downstream end connected to an air injector 13 through which pressurized air from the pump 10 is injected into the exhaust manifold 4 of the engine 1. The secondary air supply line 11 comprises upstream and downstream sections 11a and 11b which may be conduits or pipes defining therein secondary air supply passages. A check valve 12 is provided in the downstream section 11b of the secondary air supply line 11. The check valve 12 may be of any conventional structure and, in the illustrated embodiment of the invention, includes a valve member made of a thin sheet of rubber (not shown).

Between the upstream and downstream sections 11a and 11b of the secondary air supply line 11 is provided a valve unit or assembly formed by an air metering valve means 20 for controlling the rate of the secondary air supply into the engine exhaust system and a switching valve means 30 operative to interrupt the supply of the secondary air into the engine exhaust system during a high laod operation of the engine 1.

The switching valve means 30 includes a housing 301, a cover 302 and a diaphragm 303 having a peripheral edge portion clamped between the housing 301 and the cover 302 to cooperate therewith to define a vacuum chamber 312 and an atmospheric pressure chamber 313. The diaphragm 303 is connected through a rod 304 to a valve member 305. The housing 301 defines therein a chamber 306 having an air inlet port 306a to which the downstream end of the upstream section 11a of the secondary air supply line 11 is connected. The chamber 306 is provided with an air outlet port 307 defined in a piping 301a integrally fitted to the housing 301. An air return passage 308 is also formed in the housing 301 and connected to the chamber 306. The valve rod 304 extends through the return passage 308 into the chamber 306 in which the valve member 305 is disposed for movement therein. The inner end of the piping 301a provides an annular valve seat 309 for the valve member 305. A second annular valve seat 310 for the valve member 305 is formed in the housing 301 around an opening which communicates the chamber 306 with the return passage 308. The two valve seats 309 and 310 are axially aligned with each other. The valve member 305 is movable by the diaphragm 303 into sealing engagement either with the valve seat 309 or with the valve seat 310, as will be described in more detail later. A third valve seat 311 is formed within the housing 301 between the air inlet port 306a and the chamber 306 for the purpose to be made apparent later.

The vacuum chamber 312 is connected through a vacuum conduit 40 to the intake system of the engine 1 downstream of the throttle valve 8 so that the intake manifold vaccum is always introduced into the chamber 312, whereas the atmospheric pressure chamber 313 is vented to the atmosphere through a vent hole 314. A compression coil spring 315 is disposed in the vacuum chamber 312 to resiliently bias the diaphragm 303 towards the atmospheric pressure chamber 313. When the intake vacuum fed into the vacuum chamber 312 and acting on the diaphragm 303 produces a force which is greater than the predetermined spring force of the spring 315, the diaphragm is deformed into the vacuum chamber 312 against the spring 315 to pull the rod 304 and the valve member 305 leftwards as viewed in FIG. 1. However, when the intake vacuum is of such a lower vacuum level as is experienced during either an acceleration engine operation or full load engine operation, the spring 315 pushes the diaphragm 303 rightwards against the force of the intake vacuum acting on the diaphragm. As an example, the spring force of the spring 315 is predetermined such that the valve member 305 is moved away from the valve seat 309 when the intake manifold vacuum exceeds a vacuum level of −110 mmHg.

The air metering valve means 20 includes a housing 201, a cover 202 and a second diaphragm 203 having a peripheral edge portion clamped between the housing 201 and the cover 202. The diaphragm 203 is connected through a rod 204 to a valve member 205. The housing 201 is sealing secured or coupled to the housing 301 of the switching valve means 30 to form a unitary valve housing structure. An annular plate 207 having a central opening 208 is clamped between the housings 201 and 301 and positioned in axial alignment with the third valve seat 311 formed in the housing 301 of the switching valve means 30. The housing 201 of the air metering valve means 20 cooperates with the annular plate 207 to define an air return passage 206 having a downstream end or an air outlet port pneumatically connected to the air cleaner 2 by an air return pipe 206a. The valve member 205 is disposed in the air inlet port 306a of the switching valve means 30 for movement between the third valve seat 311 and a fourth valve seat 209 provided by the undersurface of the annular plate 207 around the central opening 208 formed therein. The rod 204 extends through the air return passage 206 formed in the housing 201 of the air metering valve means 20 and through the opening 208 in the plate 207. The air return passage 206 has its upstream end formed in the housing 201 and connected to the air return passage 308 formed in the housing 301 of the switching valve 30. A check valve comprising a ball 210 and a compression coil spring 211 is disposed at the junction between the air return passages 308 and 206 and operative to permit only the flow of air from the passage 308 to the passage 206.

The diaphragm 203 cooperates with the cover 202 to define a pressure responsive chamber 212 which is connected to a signal pressure line 41 in which a solenoid operated three way valve 42 is provided to communicate the signal pressure line 41 selectively with the vacuum line 40 or with the atmosphere so that the chamber 212 is supplied either with the intake vacuum or with the atmospheric pressure. The diaphragm 203 and the housing 201 cooperate together to define an atmospheric pressure chamber 213 which is vented to the atmosphere through a vent hole 214 formed in the housing 201. A spring 215 is disposed in the chamber 212 to resiliently bias the diaphragm 203 towards the atmospheric pressure chamber 213. The arrangement is such that the diaphragm 203 is deformed into the chamber 212 against the force of the spring 215 when the force produced by the vacuum acting on the diaphragm 203 is greater than the force of the spring 215. However, either when the intake vacuum is of a lowered vacuum level or when the chamber 212 is fed with the atmospheric pressure, the spring 215 pushes the diaphragm 203 into the atmospheric pressure chamber 213. As an example, the force of the spring 215 is determined such that the valve member 205 is moved away from the valve seat 311 to communicate the air inlet port 306a with the chamber 306 when the intake vacuum exceeds a vacuum level of −45 mmHg.

The three way solenoid valve 42 is controlled as follows: The electric output of the air-fuel ratio sensor 7 is fed through a conductor 43 into a computor 44 which is operative to compare the output of the sensor 7 with a predetermined reference voltage to control the electrical supply to the three way solenoid valve 42. The arrangement is such that, when the sensor output is higher than the reference voltage, the solenoid valve 42 is switched on to allow the engine intake vacuum to be fed into the pressure sensitive chamber 212 of the air metering valve means 20, and such that, when the sensor output is lower than the reference voltage, the solenoid valve 42 is switched off to cause the atmospheric pressure to be fed into the chamber 212 of the air metering valve means 20.

Preferably, a vacuum delay valve 50 comprising a fixed restriction orifice 51 and a check valve 52 disposed in parallel relationship thereto is provided in the vacuum line between the vacuum chamber 312 of the switching valve 30 and the point of connection of the vacuum line 40 with the three way solenoid valve 42.

With the structure and arrangement discussed above, the intake vacuum applied to the vacuum chamber 312 of the switching valve 30 is high enough to bias the diaphragm 303 leftwards against the compression spring 303 during a normal engine operation, so that the valve member 305 is in sealing engagement with the valve seat 310 to switch off the communication between the chamber 306 and the air return passage 308 and communicate the chamber 306 with the air outlet port 307.

With the parts in the positions described, if the air-fuel ratio of the exhaust gases in the engine exhaust system is of a "rich" value, the air-fuel ratio sensor 7 will emit a "rich" signal, namely, an electric voltage higher than the reference voltage of the computor 44. This "rich" signal is fed into the computor 44, with a result that the computor closes the electric circuit to the solenoid valve 42 to switch off the same so that the intake vacuum is fed from the vacuum line 40 through the solenoid valve 42 and through the signal conduit 41 into the pressure sensitive chamber 212 of the air metering valve 20. Accordingly, the intake vacuum acts on the diaphragm 203 and upwardly deforms the same against the compression spring 215 to move the valve member 205 into sealing engagement with the valve seat 208 to close the opening 208 and communicate the air inlet port 306a with the chamber 306 and hence with the air outlet port 307. Thus, the air discharged from the air pump 10 flows through the air supply line 11a, the air inlet port 306a, the chamber 306, the air outlet port 307, the air supply line 11b, the check valve 12 and through the air injector 13 into the exhaust manifold 4 of the engine 1.

The supply of the secondary air causes a condition in which the engine exhaust gases flowing past the air-fuel ratio sensor 7 contain an excessive amount of oxygen, with a result that the senor 7 then emits a "lean" signal, namely, an electric voltage lower than the reference voltage of the computor 44. This "lean" signal is fed into the computor 44, so that the latter opens the electric circuit to the solenoid valve 42 to switch off the same, with a result that the atmospheric pressure is introduced into the chamber 212 of the air metering valve means 20. The diaphragm 203 and the valve member 205 are then biased downwards by the compression spring 215, so that the valve member 205 is engaged with the valve seat 311 to cut off the communication between the air inlet port 306a and the chamber 306 and communicate the air inlet port 306a with the air return passage 206. Accordingly, the air discharged from the air pump 210 flows through the air supply line 11a, the air inlet port 306a, the opening 208 in the plate 207, the air return passage 206 and through the line 206a back into the air cleaner 2. Thus, no secondary air is supplied into the engine exhaust system.

As such, the secondary air supply to the exhaust system of the internal combustion engine 1 is controlled in accordance with the air-fuel ratio in the engine exhaust system as detected by the sensor 7 so that the air-fuel ratio of the engine exhaust gases passing through the catalyst device 6 is kept substantially constant.

Figure 2:
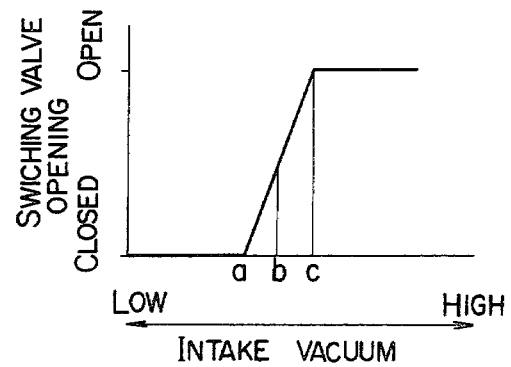
FIG. 2 graphically illustrates the operational characteristic of the system shown in FIG. 1.

When the engine 1 operates in a high load condition with the intake vacuum being at a vacuum level lower than the vacuum level a in FIG. 2, the force of the spring 315 acting on the diaphragm 303 of the switching valve means 30 is greater than the force produced by the intake vacuum acting on the diaphragm 303, thereby biasing the diaphragm rightwards to move the valve member 305 away from the valve seat 310 into sealing engagement with the valve seat 309. In this position of the valve member 305, if the valve member 205 of the air metering valve means 20 is in engagement with the valve seat 311, the air from the air pump 10 flows through the air inlet port 306a, the opening 208 in the plate 207, the air return passage 206 and through the line 206a back into the air cleaner 2. In the case where the valve member 205 is in engagement with the valve seat 209, the air from the air pump 10 flows through the air inlet port 306a, the chamber 306 and the air return passage 308. The pressure of the air is high enough to lift the ball 210 against the spring 211, so that the air flows from the return passage 308 in the housing 301 into the air return passage 206 in the housing 201 and, hence, back into the air cleaner 2.

As described, the secondary air supply to the engine exhaust system is interrupted in a high load engine operating condition in which the engine intake vacuum is lower than the vacuum level a in FIG. 2, thereby to advantageously prevent the exhaust system (particularly the catalyst device 6) from otherwise being overheated. In addition, the spring force of the spring 315 is advantageously determined to be sufficiently strong enough to avoid the counter-flow of the engine exhaust gases from the exhaust manifold 4 back into the secondary air supply system even if the check valve 12 is omitted or damaged.

In the case where the engine intake vacuum is increased to fall within the range from the vacuum level a to the vacuum level c and, for example, is at the vacuum level of b, the valve member 305 of the switching valve means 30 is in a neutral position between the two valve seats 309 and 310. In this position of the valve member 305, if the air-fuel ratio of the exhaust gases in the exhaust system is of a "lean" value, the valve member 205 of the air metering valve means 20 is engaged with the valve seat 311 to cause the air from the air pump 10 to be returned back into the air cleaner 2 in the manner discussed above. It will be noted that, if the check valve formed by the ball 210 and the compression spring 211 were not provided in the air return passage 206 in the valve means 20, a part of the air to be returned to the air cleaner 2 would flow from the return passage 206 through the air return passage 308 and the air outlet port 307, with a resultant disadvantage that, in spite of the valve means 20 being closed in compliance with instructions from the air-fuel ratio sensor 7, the secondary air is supplied into the exhaust system of the engine 1 to cause the air-fuel ratio in the exhaust system to fall out of the range of the operation of the three way catalyst device 6, resulting in the increase in the emission of the harmful components of the engine exhaust gases. The embodiment of the invention described above, however, is completely free from such a disadvantage because the check valve 210, 211 disposed in the air return passage 206 does not permit the air flow from the air return passage 206 to the air return passage 308. Accordingly, the secondary air supply to the engine exhaust system is always controlled by the air metering valve 20 in the case where the engine intake vacuum is of a vacuum level higher than the level a shown in FIG. 2, namely, when the engine 1 is operating under a low or medium load, whereby the air-fuel ratio of the exhaust gases in the engine exhaust system is kept at a substantially constant value required for the operation of the three way catalyst in the catalyst device 6, thereby preventing the disadvantageous increase of the emission of the harmful exhaust gas components which would otherwise be caused in the case where the check valve 210, 211 is not provided.

If the air metering valve means 20 were disposed downstream of the switching valve means 30 (i.e., nearer to the engine exhaust system than the switching valve means 30), a problem of counter-flow of engine exhaust gases through the air metering valve means 20 to the air cleaner 2 or into the atmosphere would be caused during a high load engine operation (in which the exhaust gas pressure is highest) if or when something abnormal, such as the breakage of the check valve 12, occurs. In the system of the present invention, however, the switching valve 30 is disposed downstream of the air metering valve means 20 and closed during a high load engine operation to advantageously present any counter-flow of the engine exhaust gases from the engine exhaust system to the air cleaner 2 or the atmosphere.

It will be appreciated that, since the air metering valve means 20 for controlling the rate of the secondary air supply and the switching valve means 30 operative to interrupt the supply of the secondary air to the engine exhaust system are assembled and united into a unitary structure in the illustrated embodiment of the invention, the entire system can advantageously be compact, small-sized and lightweighted and, moreover, can easily be mounted on a vehicle. In addition, the system can be composed of a reduced number of components as compared with the prior art because the system does not need hoses and clamps which would be required to pneumatically connect the two valve means 20 and 30 if they are disposed separately.

The vacuum delay valve 50 disposed in the vacuum line 40 is operative to assure that the vacuum pressure is retained in the vacuum chamber 312 of the switching valve means 30 to continue the secondary air supply for a while after an acceleration operation is initiated.

The check valve disposed between the air return passages 308 and 206 may alternatively be constituted solely by the ball 210 rather than being constituted by the combination of the ball 210 and the spring 211. Further alternatively, the check valve may be formed of such a thin sheet of rubber as is used to make the check valve 12 in the secondary air supply line 11b, or of such a thin sheet of metal as is used to make a reed valve.

An air relief valve for protecting the air pump and/or a so-called "air bypass valve" (or "antiafterburn valve") for preventing an afterfire during a deceleration engine operation may be provided in the system of the invention.

The air metering valve means 20 is of a diaphragm-actuated type in the illustrated embodiment of the invention. The valve means, however, may alternatively be in the form of a proportional solenoid valve in which a solenoid is used to continuously vary the opening of the valve member 205 in accordance with the electric supply to the solenoid. In this modification, the computor 44 should be of the type in which the ampere of the electric current supplied to the proportional solenoid valve is continuously controlled in relation to the electric output of the air-fuel ratio sensor 7.

The switching valve means 30 may also alternative be in the form of a solenoid valve. In this modification, the electric supply to the solenoid valve is controlled by means of a sensor which is operative to detect either the degree of opening of the throttle valve 8 or the vacuum level of the engine intake vacuum.

The exhaust gas purification system of the invention may be further provided with a sensor for detecting the engine cooling water, a sensor for detecting the temperature of the three way catalyst in the catalyst device 6 and a sensor for detecting either the speed of the vehicle on which the engine is mounted or the degree of opening of the throttle valve 8. In this case, the outputs of the respective sensors may be fed into the computor 44 so that the three way solenoid valve 42 is switched on to feed all the secondary air into the engine exhaust system for thereby facilitating the warm up of the catalyst when the engine cooling water is at a low temperature, so that the solenoid valve 42 is switched off to interrupt the secondary air supply to the engine exhaust system for thereby preventing the catalyst from being overheated when the catalyst temperature sensor detects a temperature higher than a predetermined temperature, and so that the secondary air supply is also interrupted or stopped during a high speed operation of the vehicle to prevent the catalyst from being overheated.

The vacuum delay valve 50 is not essential for the present invention and may be omitted.

As described above, the switching valve means 30 provided in addition to the air metering valve means 20 is operative to interrupt the secondary air supply to the engine exhaust system during a high load engine operation to advantageously prevent the overheating of the exhaust system and particularly the catalyst device 6 therein during the high load engine operation for thereby improving the durability of the exhaust gas purification system. In addition, the fact that the switching valve means 30 is disposed in the secondary air supply system downstream of the air metering valve means 20 and the spring 315 urges the valve member 305 against the valve seat 309 with a substantial force during a high load engine operation, the switching valve means 30 surely prevents a counter-flow of the engine exhaust gases back into the secondary air supply system even during the high load engine operation (in which the exhaust gas pressure is highest and the exhaust gas counter-flow is most likely to occur) and even during an abnormal state of the system, such as the failure of the check valve 12 due to breakage.

What is claimed is:

1. An exhaust gas purification system for an internal combustion engine comprising:

a secondary air supply system for supplying a secondary air into the exhaust system of the engine, an air-fuel ratio sensor disposed in the engine exhaust system to detect the oxygen content of the engine exhaust gases and emit an electric output signal representative of the oxygen content of the exhaust gases thus detected, and a three-way catalyst means disposed in the exhaust system for facilitating purification of the exhaust gases, said secondary air supply system including a secondary air supply line having a downstream end connected to said exhaust system upstream of said catalyst means, an air pump having an air discharge port connected to said secondary air supply line, an air metering valve means disposed in said secondary air supply line downstream of said air pump and operative to control the rate of the secondary air supply into the exhaust system in accordance with the outputs of the air-fuel ratio sensor, and a switching valve means disposed in said secondary air supply line downstream of said air metering valve means and operative to interrupt the supply of the secondary air into said exhaust system during a high load engine operation, wherein said air metering valve means includes a first valve member and a first valve actuator operatively associated therewith, said switching valve means includes a second valve member and a second valve actuator operatively associated therewith, and said air metering valve means and said switching valve means have a common valve housing structure disposed in said secondary air supply line, and wherein said valve housing structure defines therein a first air passage forming a part of said secondary air supply line and comprising an air inlet port, a first air outlet port and a chamber therebetween, said valve housing structure also defining therein a second air passage having an upstream end connected to said chamber and terminating in a second air outlet port, said second air passage including a check valve disposed therein to permit only the flow of air from said chamber to said second air outlet, said valve housing structure further defining therein a third air passage interconnecting said air inlet port and said second air passage downstream of said check valve, said first valve member being disposed in said valve housing structure between said chamber and said third air passage to control the communication between said air inlet port and said chamber and the communication between said air inlet port and said third air passage, said second valve member being disposed in said chamber to interrupt the communication between said chamber and said first air outlet port and communicate said chamber with said second air passage during a high load engine operation.

2. The engine exhaust gas purification system according to claim 1, wherein said second air outlet port is connected to the intake system of said engine.

3. The engine exhaust gas purification system according to claim 1 or 2, wherein said first valve actuator includes a first diaphragm mechanically connected to said first valve member and being selectively subjected to the intake manifold vacuum of the engine and the atmospheric pressure.

4. The engine exhaust gas purification system according to claim 3, further including a multi-position solenoid operated valve means having two ports pneumatically connected to the engine intake system downstream of the engine throttle valve and to said first valve actuator and another port open to the atmosphere, and a computor electrically connected to said air-fuel ratio sensor and to said solenoid operated valve means so that the latter is actuated to control the operation of said first valve actuator and thus the position of said first valve member.

5. The engine exhaust gas purification system according to claim 1 or 2, wherein said second valve actuator includes a second diaphragm mechanically connected to said second valve member and always exposed to the intake manifold vacuum of the engine.

6. The engine exhaust gas purification system according to claim 3, wherein said second valve actuator includes a second diaphragm mechanically connected to said second valve member and always exposed to the intake manifold of the engine.

7. The engine exhaust gas purification system according to claim 6, further including a multi-position solenoid operated valve means having two ports pneumatically connected to the engine intake system downstream of the engine throttle valve and to said first valve actuator and another port open to the atmosphere, and a computor electrically connected to said air-fuel ratio sensor and to said solenoid operated valve means so that the latter is actuated to control the operation of said first valve actuator and thus the position of said first valve member.

8. The engine exhaust gas purification system according to claim 5, wherein said second valve actuator is pneumatically connected to the engine intake system downstream of the engine throttle valve by means of a vacuum line in which a vacuum delay valve is disposed, said vacuum delay valve comprising a fixed restriction orifice and a second check valve disposed in parallel relationship to said restriction orifice.

9. The engine exhaust gas purification system according to claim 6, wherein said second valve actuator is pneumatically connected to the engine intake system downstream of the engine throttle valve by means of a vacuum line in which a vacuum delay valve is disposed, said vacuum delay valve comprising a fixed restriction orifice and a second check valve disposed in parallel relationship to said restriction orifice.

* * * * *